United States Patent Office 2,921,941
Patented Jan. 19, 1960

2,921,941

PRODUCTION OF INDOLYLMETHYL-HYDANTOIN

James N. Coker and Melvin Fields, Wilmington, Del., and Arthur O. Rogers, Lewiston, N.Y., assignors to E. I. du Pont de Nemours and Company, Wilmington, Del., a corporation of Delaware No Drawing. Application February 21, 1958
Serial No. 716,551

3 Claims. (Cl. 260—309.5)

This invention relates to the preparation of hydantoins and is more particularly concerned with a new route to 5-(3-indolylmethyl)-hydantoin.

In our application Serial No. 684,416, filed September 17, 1957, it is disclosed that 3-indoleacetaldehyde hydrazones such as 3-indoleacetaldehyde semicarbazone or 3-indoleacetaldehyde phenylhydrazone, or their 1-acetyl derivatives, are converted to 5-(3-indolylmethyl)-hydantoin by reaction with ammonium ions, carbonate ions and cyanide ions in solution, and that this hydantoin is readily hydrolyzed to tryptophan. Tryptophan is a known aminoacid of considerable commercial value. Another method for preparing 5-(3-indolylmethyl)-hydantoin has now been found, using a new 3-indoleacetaldehyde derivative.

It is an object of this invention ot provide a new process for the preparation of 5-(3-indolylmethyl)-hydantoin. Other objects will become apparent from the specification and claims.

In accordance with this invention a new compound, 3-indoleacetaldehyde oxime, or its 1-acetyl derivative, has been found particularly useful for preparing 5-(3-indolylmethyl)-hydantoin by the following reaction:

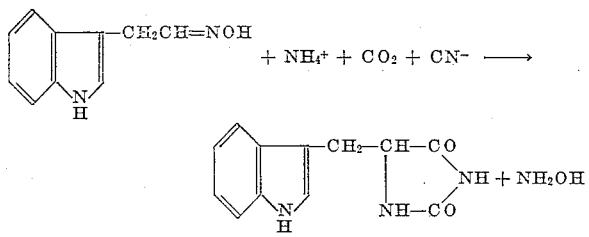

In the process of this invention the 3-indoleacetaldehyde oxime or 1-acetyl-3-indoleacetaldehyde oxime is heated in an inert polar solvent, preferably water or a lower alcohol or a mixture thereof, containing ammonium ions, carbonate ions and cyanide ions. Ammonium carbonate and hydrogen cyanide are the most convenient sources of the required ions, but other materials can obviously be used to form these ions in solution. Thus carbon dioxide and ammonia or various ammonium salts can be added separately, in place of ammonium carbonate, and metal cyanides can be used in place of hydrogen cyanide. Solid carbon dioxide can be added to increase the concentration of carbon dioxide in solution. The addition of a small amount of sodium hydrogen sulfite or other bisulfite will usually increase the yield, but is not essential. The yield may also be improved by complete exclusion of oxygen from the reaction. A reaction temperature of about 40° C. to about 220° C. is suitable, with pressure being required at the higher temperatures. The optimum reaction temperature is 100° to 150° C. At about 100° C. the reaction is usually complete in about 3 to 4 hours. The relatively insoluble hydantoin product can be recovered by concentrating the reaction mixture, dissolving the salts in a solvent and filtering off the product.

The yield can frequently be improved by concentrating the filtrate or salting out dissolved product with neutral salts, e.g., sodium sulfate. The hydantoin is purified by recrystallization from water or other solvent.

In the following examples, which illustrate preferred embodiments of the invention, parts are by weight:

EXAMPLE 1

(a) *Preparation of 3-indoleacetaldehyde oxime*

To 1.4 parts of hydroxylamine hydrochloride and 0.8 part of sodium hydroxide was added 50–60 parts of water. 3-indoleacetaldehyde, derived from 7.0 parts 1,3-diphenyl-2-(3′-indolylmethyl)-imidazolidine and dissolved in 10 parts absolute ethanol, was added to this solution of reagents and the resulting mixture heated for 0.5 hour on a steam bath. All of the solvent was then removed by heating in a Rinco evaporator under aspirator vacuum. The brown residue (3 parts) obtained was triturated with water and then air-dried; it melted at 124–130°. The yield of this material amounted to 86% based on the amount of 1,3-diphenyl-2-(3′-indolylmethyl)-imidazolidine used to prepare the free aldehyde. Recrystallization of the oxime from hot aqueous ethanol raised its melting point to 140–142°.

*Analysis.*—Calc'd for $C_{10}H_{10}ON_2$: C, 68.95; H, 5.79; N, 16.08. Found: C, 69.30, 69.23; H, 5.81, 5.91; N, 16.21, 16.34.

(b) *Conversion to 5-(3-indolylmethyl)-hydantoin*

A mixture of 12 parts of 3-indoleacetaldehyde oxime, 43.3 parts of ammonium carbonate, 7.5 parts of hydrogen cyanide and 1.8 parts of sodium bisulfite in a mixture of about 200 parts of water and 250 parts of methanol was heated in a pressure vessel lined with Hastelloy B at 100° C. for 3.5 hours. The solvents were then removed under reduced pressure to leave a pale brown solid (20.2 parts). This crude product was extracted with two portions (100 parts each) of cold water to remove salts. The undissolved solid was boiled with 1000 parts of water and filtered hot. Evaporation of the filtrate to dryness left 9.3 parts (58.8% yield) of 5-(3-indolylmethyl)-hydantoin, M.P. 206–213° C. Recrystallization of this material from water and then from methanol gave nearly white crystals melting at 220–229° C.; this material gave the same X-ray diffraction pattern as a known specimen of 5-(3-indolylmethyl)-hydantoin.

*Analysis.*—Calc'd for $C_{12}H_{11}N_3O_2$: C, 62.88; H, 4.83; N, 18.33. Found: C, 62.89; H, 4.89; N, 18.19.

EXAMPLE 2

(a) *Preparation of 1-acetyl-3-indoleacetaldehyde oxime*

To 0.7 part of hydroxylamine hydrochloride and 1.0 part of freshly fused sodium acetate was added 1.5 parts dry methanol and the resulting mixture refluxed for 15 minutes. The mixture was cooled and filtered to remove the precipitated sodium chloride. The filtrate obtained was added to 2.0 parts 1-acetyl-3-indoleacetaldehyde in 15 parts dry methanol and the resulting mixture heated at gentle reflux for 10 minutes. The volume of the mixture was reduced in vacuo to 7–8 parts and allowed to stand at 0–5° for several hours to induce precipitation of the product. The oxime, which precipitated as small pale yellow crystals, was collected by suction filtration and amounted to 1.2 parts after air-drying. A second batch of product (0.3 part) was obtained by reducing the volume of the filtrate to 4–5 ml. The total yield of oxime obtained amounted to 1.5 parts (70%). After a single recrystallization from methanol it melted at 137–138°.

*Analysis.*—Calc'd for $C_{12}H_{12}O_2N$: C, 66.67; H, 5.56; N, 12.96. Found: C, 66.96; H, 5.82; N, 12.83.

(b) *Conversion to 5-(3-indolylmethyl)-hydantoin*

1-acetyl-3-indoleacetaldehyde oxime (10 parts), ammonium carbonate (40 parts), hydrogen cyanide (approximately 20 parts), sodium bisulfite (1 part), methanol (300 parts) and water (300 parts) were charged into a Hastelloy B tube and heated at 100° for 4 hours with shaking. The reaction mixture was then cooled to 0–5°, discharged from the tube, and taken to dryness by heating in a Rinco evaporator under aspirator vacuum. The product was isolated from the oily residue by an initial extraction into hot water, followed by extraction into hot methanol. A final recrystallization from hot water yielded 5-(3-indolylmethyl)-hydantoin (approximately .5 part) which melted at 221–222°. This recrystallized product did not depress the melting point of an authentic sample of 5-(3-indolylmethyl)-hydantoin.

Since many different embodiments of the invention may be made without departing from the spirit and scope thereof, it is to be understood that the invention is not limited by the specific illustrations except to the extent defined in the following claims.

We claim:

1. The process for producing 5-(3-indolylmethyl)-hydantoin which comprises reacting a compound selected from the group consisting of 3-indoleacetaldehyde oxime and 1-acetyl-3-indoleacetaldehyde oxime, with ammonium ions, carbonate ions and cyanide ions in solution.

2. The process for producing 5-(3-indolylmethyl)-hydantoin which comprises heating a mixture of 3-indoleacetaldehyde oxime and a solution containing ammonium ions, carbonate ions and cyanide ions, and recovering the 5-(3-indolylmethyl)-hydantoin formed from the reaction mixture.

3. The process for producing 5-(3-indolylmethyl)-hydantoin which comprises heating a mixture of 1-acetyl-3-indoleacetaldehyde oxime and a solution containing ammonium ions, carbonate ions and cyanide ions, and recovering the 5-(3-indolylmethyl)-hydantoin formed from the reaction mixture.

References Cited in the file of this patent

Plieninger et al.: Chem. Ber., vol. 89, pp. 270–278 (1956).
Pschorr et al.: Chem. Abstracts, vol. 4, p. 3236 (1910).
Putochin: Chem. Abstracts, vol. 21, pp. 86, 87 (1927).